March 9, 1965  M. A. HILER ETAL  3,172,574
APPARATUS FOR SPREADING CHEMICAL FERTILIZERS
AND LIKE MATERIALS
Filed Aug. 17, 1962  5 Sheets-Sheet 1

INVENTORS
MAX A. HILER, W. D. JOHNSTON &
R. J. PEFFERS
BY MAHONEY, MILLER & RAMBO
BY
ATTORNEYS

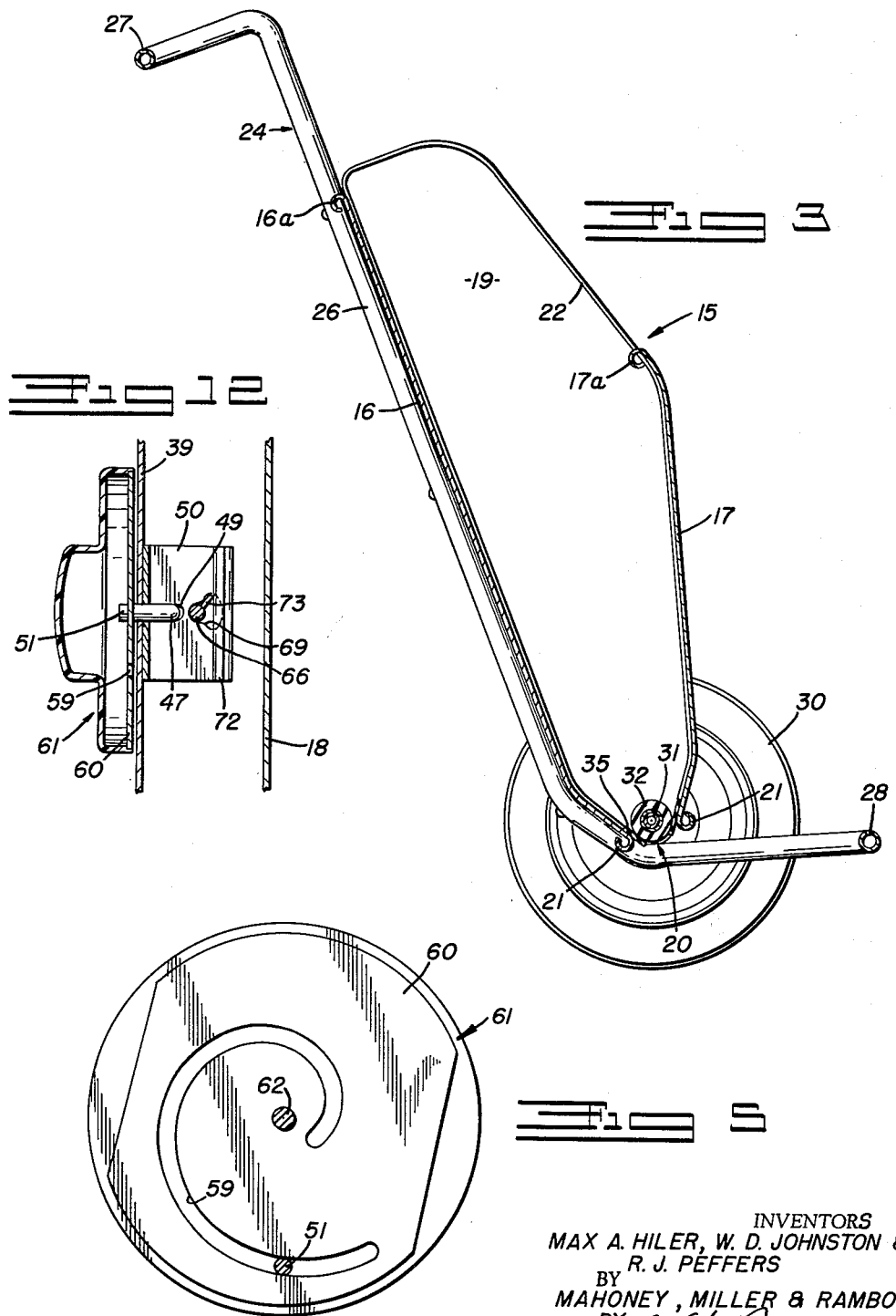

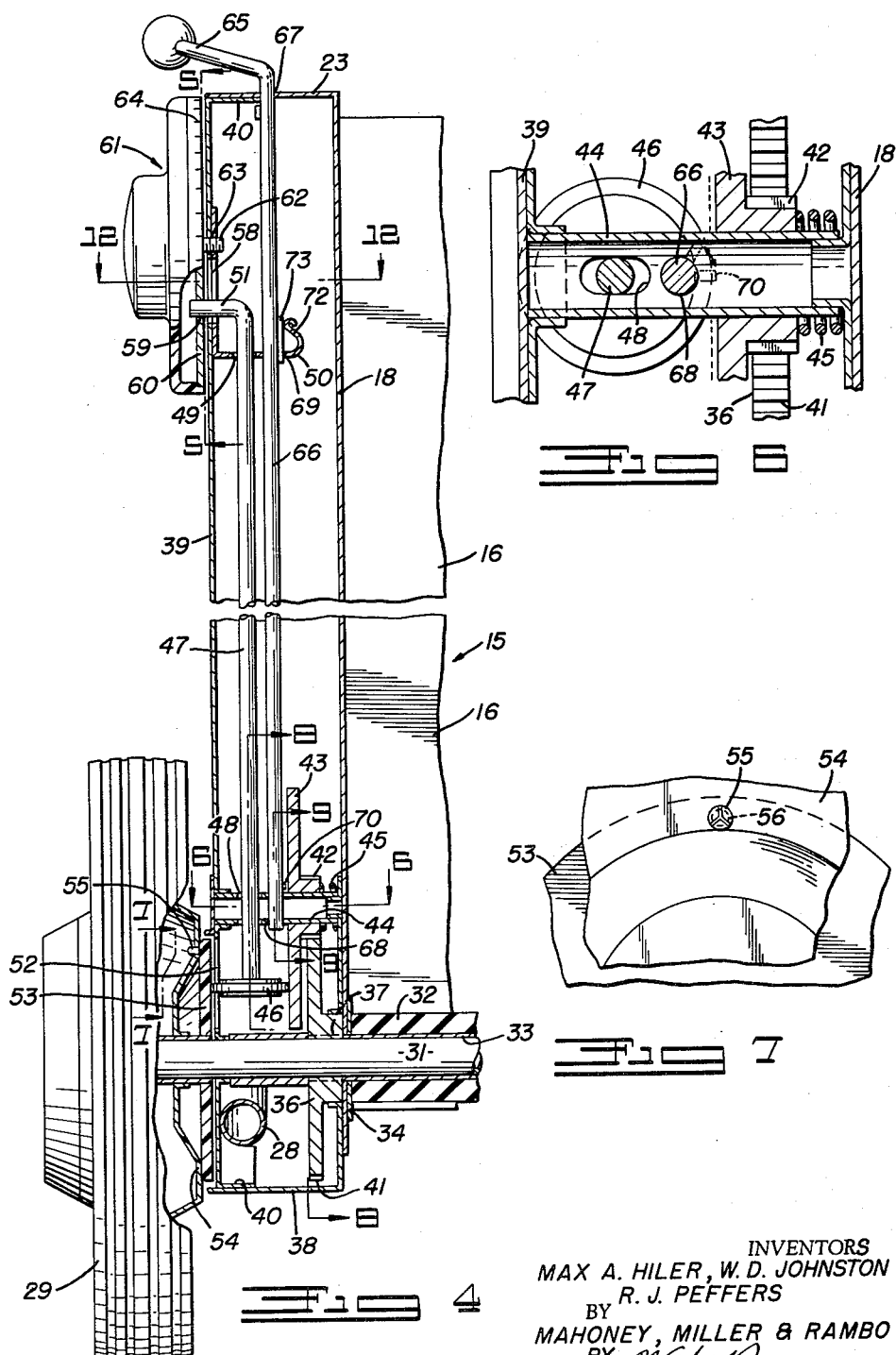

March 9, 1965
M. A. HILER ETAL
3,172,574
APPARATUS FOR SPREADING CHEMICAL FERTILIZERS AND LIKE MATERIALS
Filed Aug. 17, 1962
5 Sheets-Sheet 4
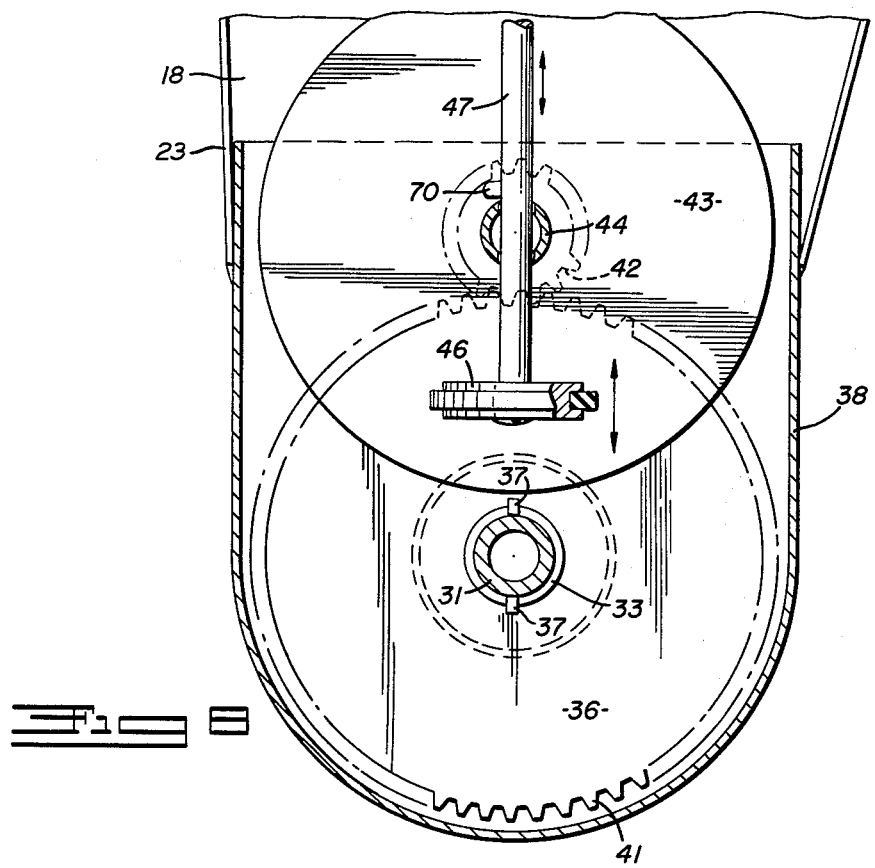
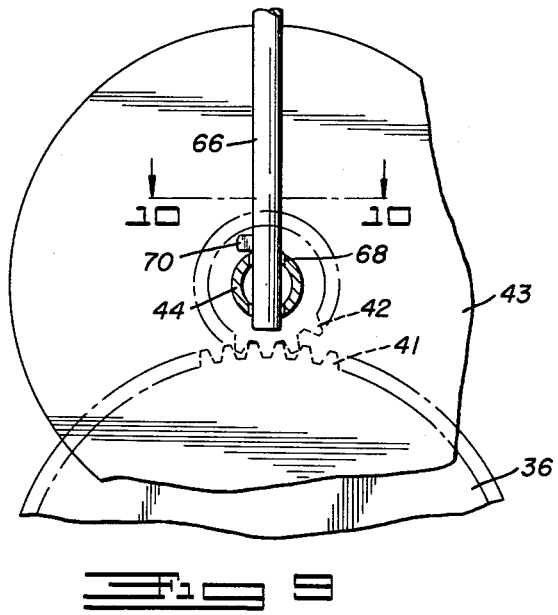
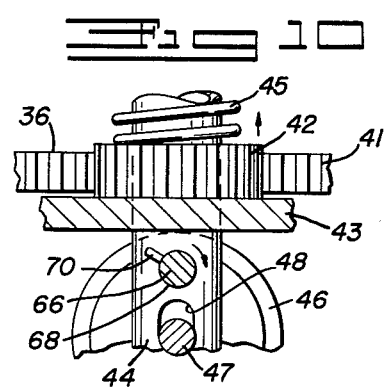
INVENTORS
MAX A. HILER, W. D. JOHNSTON &
R. J. PEFFERS
BY
MAHONEY, MILLER & RAMBO
BY
ATTORNEYS

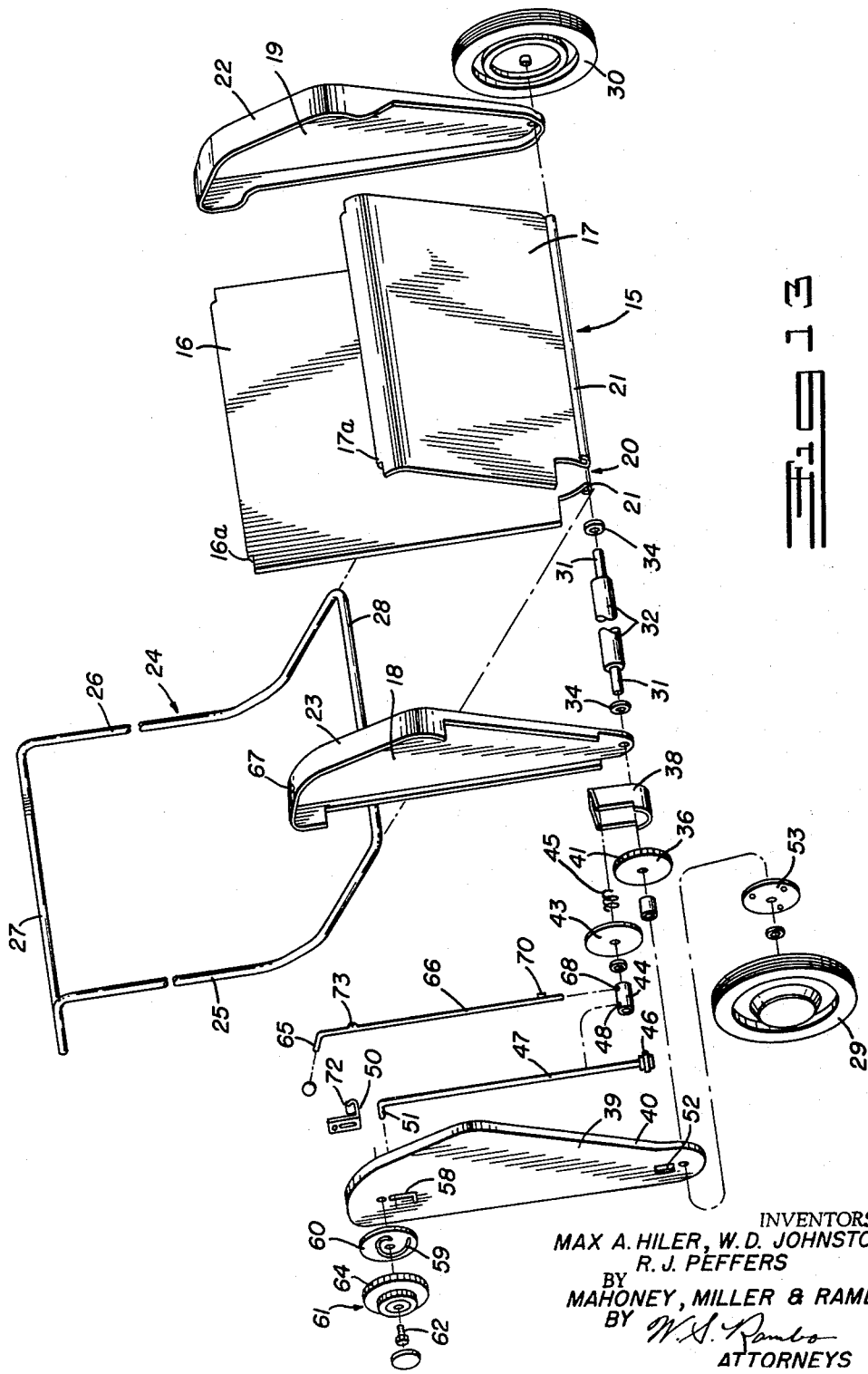

United States Patent Office 3,172,574
Patented Mar. 9, 1965

3,172,574
APPARATUS FOR SPREADING CHEMICAL
FERTILIZERS AND LIKE MATERIALS
Max A. Hiler, Madison County, and William D. Johnston and Robert J. Peffers, Franklin County, Ohio, assignors to White Castle System, Inc., Columbus, Ohio, a corporation of Delaware
Filed Aug. 17, 1962, Ser. No. 217,769
2 Claims. (Cl. 222—177)

The present invention relates generally to apparatus for spreading or distributing relatively finely divided or powdered bulk materials, such as chemical fertilizers, seeds, insecticides, herbicides, fungicides, etc. over the surface of the ground. More specifically, this invention deals with portable, wheel-mounted spreaders of the type used primarily in applying chemical fertilizers and like materials to a lawn or garden.

The use of hand-operated, portable fertilizer spreaders for the application of chemical fertilizers, seeds and like material to lawns and gardens has become well and familiarly known to the average home owner. Such spreaders are generally characterized by a material-receiving hopper supported upon a pair of ground wheels and provided with a rearwardly extending handle by which the hopper may be pushed or otherwise propelled over the ground surface. In the usual-type or portable spreader, the bottom of the hopper is provided with a transverse row of discharge openings whose effective size may be varied or adjusted by means of a manually adjustable valve plate or shutter device, so as to control the volumetric outflow of materials from the hopper onto the ground surface traversed by the spreader. These spreaders also embody a rotary agitator shaft or bar which is positioned immediately above the discharge openings of the hopper and which is driven in rotation by one of the ground wheels to insure the gravitational outflow of materials through the discharge openings of the hopper and prevent undesired bridging or clogging of materials in the hopper throat. It has been found, however, that portable spreaders of this type are inherently incapable of providing for a uniform or constant rate of discharge of materials from the hopper, due to the requirement for the material particles to drop or pass by gravity through the relatively restricted discharge openings of the hopper. As will be readily understood, a non-uniform rate of flow of materials from the spreader results in uneven application of such materials to the soil or ground surface, with the result that certain areas of the soil will receive too much material while other areas will receive too little material.

It is, therefore, the primary object of the present invention to provide an improved portable, wheel-mounted spreader which is characterized by its efficiency in providing for uniform rates of discharge of materials therefrom.

Another object of the invention is to provide a portable, wheel-mounted fertilizer spreader which incorporates a driven, rotatable feed roller for effecting a positive discharge of materials from an associated hopper in a substantially uniform, curtain-like stream onto the ground surface traversed by the spreader.

A further object of this invention is to provide a fertilizer spreader of this character in which the feed roller is driven by one or more of the ground wheels of the spreader through a variable speed transmission which may be adjusted to vary the speed of rotation of the feed roller with respect to the speed of rotation of the ground wheel, to thus control the rate of discharge of materials from the hopper.

Yet another object of the invention is to provide a fertilizer spreader which may be efficiently used to uniformly spread or distribute a variety of different types of materials, such as dry or liquid chemical fertilizers, herbicides, fungicides, insecticides, seeds or combinations thereof.

It is still a further object of the invention to provide a fertilizer spreader from which materials are positively discharged in a substantially uniform stream by means of a rotary feed roller having a resiliently compressible outer surface arranged in wiping contact with one or more relative stationary, resiliently compressible frame strips which define the outlet or discharge throat of the spreader, and wherein the outer surface of the feed roller and the frame strips are resiliently yieldable in different localized areas thereof so as to accommodate and positively convey and discharge solid, comminuted or powdered materials of varying particle sizes.

For a further and more detailed understanding of the present invention and the various additional objects and advantages thereof, reference is made to the following description and the accompanying drawings, wherein:

FIG. 3 is an enlarged, transverse vertical sectional view taken along the line 3—3 of FIG. 2;

FIG. 4 is an enlarged, fragmentary vertical sectional view taken along the line 4—4 of FIG. 1 and illustrating particularly the variable speed transmission employed in driving the feed roller;

FIG. 5 is a detailed vertical sectional view taken along the line 5—5 of FIG. 4 illustrating the manually operable control for the variable speed transmission;

FIG. 6 is a detailed horizontal sectional view taken along the line 6—6 of FIG. 4, but illustrating the feed roller driving gears disengaged from the associated wheel driven transmission;

FIG. 7 is a fragmentary elevational view taken along the line 7—7 of FIG. 4 and illustrating the connection between the driving wheel and the friction drive plate of the variable speed transmission;

FIG. 8 is an enlarged, fragmentary vertical sectional view taken along the line 8—8 of FIG. 4;

FIG. 9 is a similar view taken along the line 9—9 of FIG. 4;

FIG. 10 is a horizontal sectional view taken along the line 10—10 of FIG. 9;

FIG. 12 is a horizontal sectional view taken along the line 12—12 of FIG. 4; and FIG. 13 is an exploded perspective view showing the various parts of the present spreader disconnected from one another.

Figure 1:
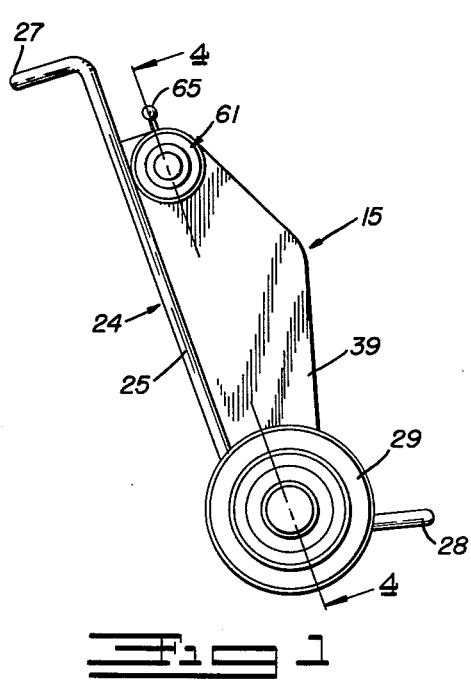
FIG. 1 is a side elevational view of a fertilizer spreader formed in accordance with the present invention.
Figure 2:
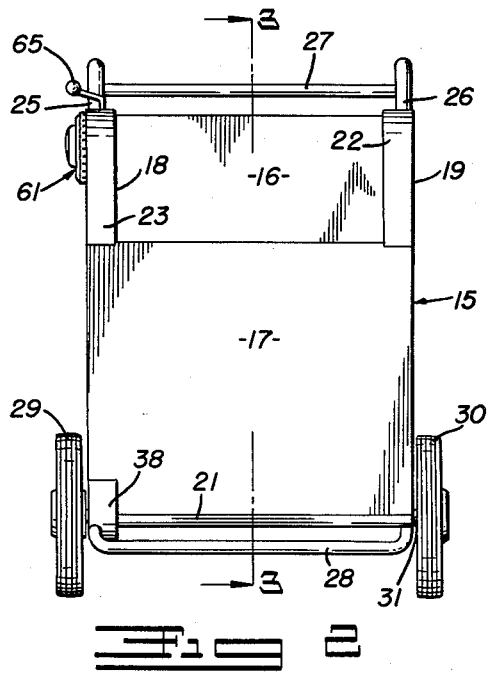
FIG. 2 is a front elevational view thereof.

Referring now to the drawings, FIGS. 1 and 2 illustrate the present fertilizer spreader in its entirety as comprising an open top hopper, designated generally at 15. The hopper 15 is formed to include a rectangular, generally vertically arranged back wall 16, a relatively foreshortened rectangular front wall 17 and oppositely disposed side walls 18 and 19. The hopper 15 is open at the upper end thereof to receive materials to be spread or distributed by the spreader. At the lower end of the hopper 15, the back and front walls 16 and 17 are tapered downwardly and inwardly in relatively convergent relation to define a downwardly opening discharge throat or slot 20 which extends substantially the full transverse width of the hopper between the side walls 18 and 19 thereof. Advantageously, the lower edges of the back and front walls 16 and 17 are rolled outwardly so as to terminate in a pair of oppositely disposed tubular flanges 21. Similarly, the upper edges of the back and front walls 16 and 17 of the hopper terminate in rolled tubular flanges 16a and 17a, respectively, to thus eliminate the presence of relatively sharp raw edges at the upper ends of the back and front walls of the hopper. As will be noted particularly by reference to FIG. 13, the right hand side wall 19 of the hopper is formed to provide an inwardly turned, substantially continuous marginal attaching flange 22 to which the side edges of the back and front walls 16 and 17 of the hopper are rigidly attached, as by welding. The left hand side wall 18, as viewed in FIG. 2, is formed to include an outwardly turned, substantially continuous, marginal attaching flange 23 to which the opposite side edges of the back wall 16 and front wall 17 are rigidly secured, as by welding.

The hopper 15 is supported upon, and rigidly secured, as by welding, to a generally rectangular, Z-shaped tubular metal frame 24 which is formed to include a pair of relatively spaced, straight parallel side bars 25 and 26 formed at their opposite ends with integral, laterally offset, U-shaped handle and foot bars 27 and 28, respectively.

The hopper 15 and its tubular metal frame 24 are supported, as a unit, upon a pair of transversely spaced ground wheels 29 and 30 for traversing movement over the terrain. Each of the ground wheels 29 and 30 are rotatably carried at the opposite ends of a transverse axle shaft 31 which extends through the lower end portion of the hopper 15 and which is supported toward its opposite outer ends by the side walls of the hopper.

Figure 11:
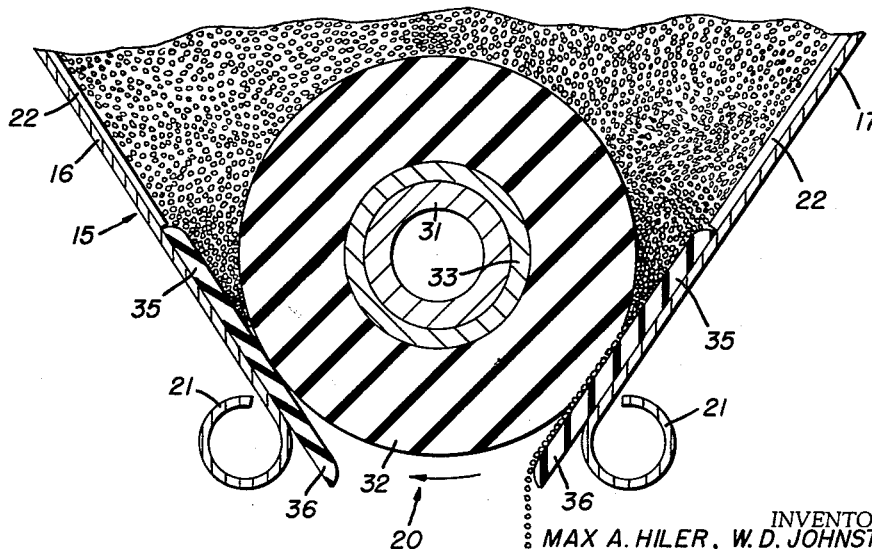
FIG. 11 is an enlarged, diagrammatic vertical sectional view taken through the bottom portion of the hopper and illustrating the material-conveying action of the feed roller.

Rotatably carried upon the intermediate portion of the axle shaft 31, between the side walls 18 and 19, is a cylindrical feed roller 32. The feed roller 32 is composed of a resiliently compressible material, preferably an expanded polyurethane resin, and is non-rotatively bonded, or otherwise secured, to a coaxial metal sleeve 33 rotatably carried upon the intermediate portion of the axle shaft 31. The length of the feed roller 32 is such that the same extends substantially the full length of the throat 20 of the hopper, and positioned between the ends of the feed roller 32 and the end walls 18 and 19 of the hopper are a pair of annular washers 34 which prevent the ends of the feed roller 32 from abrading against the side walls 18 and 19 of the hopper during rotation of the feed roller, as will be hereinafter more fully explained. As will be seen, particularly by reference to FIG. 11 of the drawings, the outer peripheral portion of the feed roller 32 is disposed in wiping engagement or contact throughout its length with a pair of relatively coextensive friction strips 35 which are preferably formed of the same resiliently compressible material as the feed roller 32, and which are adhesively bonded or otherwise suitably secured to the inner surfaces of the back and front walls 16 and 17 of the hopper in the area of the discharge throat 20 thereof. Preferably, the friction strips 35 extend downwardly slightly beyond the lower edges of the back and front walls of the hopper and terminate in resiliently flexible lip portions 36 which define an elongated, downwardly opening discharge slot disposed at the bottommost portion of the hopper. It will thus be seen that the feed roller 32 is disposed in coextensive closing relation to the discharge throat or outlet slot of the hopper and therefore prevents the gravitational outflow of materials from the lower end of the hopper in the absence of axial rotation of the feed roller. As will be hereinafter more fully explained, axial rotation of the feed roller 32 in either direction will serve to positively convey materials deposited in the hopper outwardly through the discharge throat 20 in a relatively thin curtain-like stream whose width is substantially equal to the length of the discharge throat 20. This conveying action is accomplished by the progressive squeezing of material particles between the outer peripheral surface of the feed roller 32 and one of the resiliently yieldable friction strips 35, as indicated diagrammatically in FIG. 11.

The feed roller 32 of the present fertilizer spreader is adapted to be driven in axial rotation upon rotation or rolling movement of the ground wheel 29, but in order to provide for variation in the speed of rotation of the feed roller 32 relative to the speed of rotation of the ground wheel 29, the present spreader is provided with an adjustable, variable speed transmission and associated clutch mechanism for drivingly connecting the feed roller 32 for rotation in unison with the ground wheel 29. One form of adjustable, variable speed transmission mechanism is illustrated particularly in FIGS. 4 through 10 of the drawings. As shown in FIG. 4, the coaxial metal sleeve 33, on which the feed roller 32 is carried, extends leftwardly beyond the end of the feed roller 32 into the central circular hub portion of a pinion gear 36. The gear 36 is preferably drivingly connected with the sleeve 33 by means of a pair of keys 37 which interfit within cooperative keyways formed in the hub portion of the gear 36 and the end extension of the sleeve 33. Also, the gear 36 and the remaining components of the variable speed transmission are housed within a suitable chamber provided by a gear box-forming casing 38 which nests within and is rigidly secured to the outwardly turned marginal flange 23 of the side wall 18. As shown particularly in FIG. 4, the casing 38 is formed to include an outer, vertically arranged side wall 39 disposed in spaced, parallel relation to the side wall 18 of the hopper, and formed with an inwardly turned marginal edge flange 40 which interfits within and is rigidly secured to the marginal flange 23 of the side wall 18. Thus, the side walls 18 and 39 define therebetween a substantially enclosed compartment or chamber for the variable speed transmission mechanism and its associated controls.

The gear 36 is provided upon its peripheral surface with gear teeth 41 which are arranged in meshing engagement with a circular gear 42 formed on the hub portion of a circular friction disk 43. The friction disk 43 is rotatably supported upon a tubular stub shaft 44 which is rigidly carried between the side walls 18 and 39, and mounted between the hub portion of the disk 43 and the side wall 18 of the hopper is a coil compression spring 45 which is arranged normally to urge the disk 43 leftwardly, as viewed in FIG. 4, into engagement with the peripheral surface of an idler wheel or roller 46. As will be noted, the gear 42 formed on the hub of the disk 43 is substantially wider than the gear teeth 41 of the gear 36 whereby to permit axial sliding movement of the disk 43 on the stub shaft 44 without disengagement of the gear 42 from the teeth 41 of the gear 36.

The idler wheel or roller 46 is rotatably carried on the lower end of a vertically extending control rod or shaft 47 which projects upwardly through a pair of diametrically opposed, elongated slots 48 formed in the stub shaft 44, thence through an elongated slot 49 formed in a shelf bracket 50 which projects inwardly from the side wall 39 of the casing 38, and then terminates in a right angularly bent cam follower arm 51. Thus, the rod 47 and idler wheel 46 are supported for vertical movement within the casing 38, whereby the idler wheel 46 may be moved to different radial positions of contact with the friction face of the disk 43. The side wall 39 of the gear casing 38 is slotted, as at 52, to permit a peripheral segment of the idler wheel 46 to project slightly outwardly beyond the wall 39 and into frictional contact with the face of a second friction disk 53 which is non-rotatably secured to the inner hub portion 54 of the ground wheel 29. As will be noted from FIGS. 4 and 7, the friction drive disk 53 is of annular configuration, and is preferably formed from a rigid plastic or synthetic resin. The disk 53 is formed with a plurality of circumferentially spaced, axially projecting, split studs 55 which are snap fitted into cooperative openings 56 formed at circumferentially spaced intervals in the inner hub portion 54 of the wheel 29. Thus, the friction drive disk 53 is arranged to be carried in rotation with the ground wheel 29, and upon rotation of the drive disk 53, the idler wheel 46 is also rotated about the rod 47, due to its frictional contact with the outer face of the disk 53. The idler wheel 46, when in frictional contact with the face of the disk 43, causes the disk 43 to rotate in a direction opposite the direction of rotation of the disk 53, to thus impart rotation to the gear 36 and its associated feed roller 32.

As will be readily apparent, the drive ratio between the wheel-mounted disk 53 and the second friction disk 43 may be varied by shifting the position of the idler wheel 46 radially with respect to the disks 53 and 43. In other words, by moving the rod 47 downwardly, as viewed in FIG. 4, the idler wheel 46 engages the drive disk 53 at a position thereon relatively close to the axis of rotation of the disk 53, to thus cause the idler wheel 46 to be rotated at a slower rate of speed than when the idler wheel 46 occupies a position of engagement with the disk 53 located toward the outer periphery thereof. Thus, by shifting the idler wheel 46 radially outwardly on the disk 53, the idler wheel will be rotated at a faster speed per revolution of the disk 53. At the same time, as the idler wheel 46 is shifted outwardly on the disk 53, it moves inwardly toward the hub portion of the disk 43 to thus increase the speed of rotation of the disk 43 per revolution of the idler wheel 46.

The relative radial position of the idler wheel 46 with respect to the disks 43 and 53 may be adjusted by vertical movement of the rod 47, and toward this end, the cam follower arm or extension 51 of the rod 47 is arranged to extend outwardly through a vertically elongated slot 58 formed in the side wall 39 of the casing 38 and into an eccentric cam slot 59 formed in an inner face plate 60 of a manually rotatable control knob 61. As shown in FIG. 4, the control knob 61 is provided with a screw-threaded, axially extending shaft 62 which projects into a cooperatively threaded socket 63 formed in the wall 39 and the bracket 50. The control knob 61 is thus axially rotatable about the shaft 62, and due to the configuration of the cam slot 59, the cam follower extension 51 of the rod 47 may be caused to move radially inwardly or outwardly in a vertical plane with respect to the axis of the knob 61. Advantageously, the outer peripheral portion of the knob 61 may be provided with scale graduations or indicia, as indicated at 64, so as to indicate, by reference to an index position on the wall 39, various settings which correspond to varying rates of discharge of materials from the hopper.

As previously indicated, the driven friction disk 43 may be disengaged from the idler wheel 46 entirely, in order to prevent rotation of the feed roller 32 when it is desired to discontinue or temporarily interrupt spreading operations during rolling movement of the spreader. This disengagement of the disk 43 is accomplished by partial rotation of a manually operated clutch lever 65 which extends outwardly through the upper end of the casing 38, above the speed control knob 61. The clutch lever 65 is formed as an angular extension of a vertically extending rod 66 which passes downwardly through the casing 38, and which is journalled for rotation within an opening 67 formed in the top wall portion of the marginal flange 23 and a pair of diametrically opposed bearing openings 68 formed in the stub shaft 44. The intermediate portion of the rod 66 also passes through a keyhole-shaped opening 69 formed in the bracket shelf 50, as shown in FIG. 12. The rod 66 is formed or otherwise provided toward its lower end with a radially outwardly extended cam boss 70 which, upon partial rotation of the rod 66 in one direction, engages the friction disk 43 in its hub region, as indicated in FIG. 6, to displace the disk 43 rightwardly, as viewed in FIGS. 4 and 6, against the action of the spring 45, to thus disengage the face of the disk 43 from the peripheral portion of the idler roller 46. In the positions of the clutch control rod 66, as shown in FIGS. 4, 9 and 10, the cam boss 70 is disengaged from the friction disk 43, thus permitting the spring 45 to force the disk 43 into frictional engagement with the outer peripheral surface of the idler wheel 46. FIG. 6 of the drawings discloses the clutch rod 66 and its associated cam boss 70 shifted to a position at which the latter disengages the disk 43 from the idler wheel 46, thereby interrupting the drive connection between the ground wheel 29 and the feed roller 32.

As shown particularly in FIG. 12, the shelf bracket 50 through which the rods 47 and 66 pass is formed to include an upwardly and inwardly turned resiliently flexible spring flange or lip 72 which is arranged to yieldably engage a radially extended tang 73 formed or otherwise provided on the intermediate portion of the rod 66. In effect, the spring lip 72 of the bracket 50 cooperates with the tang 73 to provide a friction stop for yieldably holding the rod 66 and its control lever 65 in the position at which the cam boss 70 disengages the friction disk 43 from the idler wheel 46. In other words, as the clutch lever 65 is rotated in a clockwise direction, as viewed in FIGS. 4 and 12, the tang 73 is brought into frictional engagement with the spring lip 72 of the bracket 50 at the same time that the cam boss 70 disengages the disk 43 from the idler wheel 46. Due to the resiliently applied force of the spring lip 72 upon the tang 73, the rod 66 and its lever 65 may be held in the disengaging position, but may be forceably turned in either direction within the keyhole slot 69 to disengage the tang 73 from the lip 72 and thereby permit re-engagement of the disk 43 with the idler roller 46.

As will be understood, the speed of rotation of the feed roller 32 governs the rate of discharge of materials from the hopper 15. Thus, by adjusting the radial position of the idler wheel 46 with respect to the friction disks 43 and 53, the speed of rotation of the feed roller 32, per revolution of the ground wheel 29, may be varied, within limits, so as to discharge relatively more or less material during traversing movement of the spreader over a given area of terrain. For example, when a relatively heavy application of material per area of terrain is desired, the control knob 61 is rotated in a counter-clockwise direction, as viewed in FIG. 5, to elevate the control rod 47 to its maximum upward position at which the idler wheel 46 contacts the driving friction disk 53 substantially toward the outer periphery thereof. This results in a maximum speed of rotation of the feed roller 32 per revolution of the ground wheel 29. Conversely, when a lighter application of materials is desired, the control knob 61 may be rotated in a clockwise direction, as viewed in FIG. 5, to thus force the control rod 47 downwardly from the position shown in FIG. 4, at which position the idler wheel 46 is disposed radially inwardly toward the central or hub region of the driving friction disk 53. In this latter position, the feed roller 32 will be rotated at a substantially slower rate of speed per revolution of the ground wheel 29.

Thus, in operation, the hopper body 15 is filled to a desired level with the particular material to be applied to the terrain. Filling of the hopper 15 may be easily accomplished by first tilting the spreader forwardly until the foot bar 28 of the tubular frame rests upon the ground and thereafter pouring the desired material into the hopper by way of the open upper end thereof. Next, the control knob 61, which governs the rate of feed, is adjusted to the desired position by reference to the scale graduations 64 which advantageously are predetermined in respect to various different materials to be dispensed through the spreader. The clutch lever 65 is then turned to a position at which the cam boss 70 is disengaged from the driven friction disk 43, at which time the spreader may be propelled over the terrain either by pushing or pulling upon the handle bar 27 of the frame. As the ground wheel 29 rotates in either direction, the feed roller 32 will be rotated in the same direction, but at a relative speed determined by the setting of the control knob 61. As the feed roller 32 rotates in either direction, the material above the feed roller is positively conveyed between the outer peripheral surface of the roller 32 and one of the resiliently yieldable friction strips 35 and outwardly through the bottom opening slot or throat 20 of the hopper in a continuous relatively fine, curtain-like stream onto the surface of the terrain traversed by the spreader. It will be noted by reference to FIG. 11 that particles of material within the lower portion of the hopper tend to assume a single particle thickness as they are wedged between the outer periphery of the feed roller 32 and then associated friction strip 35, and as the feed roller 32 continues in rotation, the particles are drawn between the periphery of the roller and the corresponding friction strip to be discharged through the open throat 20 in this single thickness layer. It is interesting here to note that due to the resilient compressibility of the peripheral surface of the feed roller 32 and the friction strips 35, materials having a relatively wide variance of particle size may, nevertheless, be dispensed with efficiency as larger particles of the material will only tend to locally distort or compress the surfaces of the feed roller 32 and friction strips 35 to a greater degree than smaller particles of the same material, without opening a gap between the feed roller 32 and the friction strips 35 which, otherwise, would permit smaller particles to gravitate outwardly between the roller and the friction strip.

When it is desired to discontinue or interrupt spreading action during continued rolling movement of the ground wheels of the spreader, it is necessary only to shift the clutch lever 65 to a position at which the cam boss 70 engages and displaces the driven friction disk 43 rightwardly, as viewed in FIG. 6, to disengage the disk 43 from the idler wheel or roller 46. This interruption of flow is particularly desirous when the spreader is being propelled across a walkway, sidewalk, road, etc.

It will also be understood that the present spreader may be used with a variety of different types of materials, and while the same finds particular usage in the spreading or dispensing of powdered or granular materials, such as dry chemical fertilizers, seeds and the like, it may also be used in spreading or applying liquid fertilizers, insecticides, herbicides and the like.

In view of the foregoing, it will be seen that the present invention provides an improved, mechanically efficient portable spreader or distributor for various powdered, granulated, finely divided or liquid materials. Fertilizer spreaders formed in accordance with the present invention are characterized by their versatility in providing for a widely variable rate of flow of materials therefrom, while at the same time providing a more positive and accurate pattern of distribution of such materials over a given area of terrain traversed by the spreader.

While a single preferred embodiment of the invention has been illustrated and described in detail, it will be understood that various modifications as to details of construction and design may be resorted to without departing from the spirit of the invention or the scope of the following claims.

Having described this invention, what is claimed is:

1. A hand-propelled spreader for chemical fertilizer and like materials comprising a handle-equipped frame; a ground wheel rotatably carried by said frame for supporting the latter for traversing movement over terrain; a material-receiving hopper carried by said frame and having downwardly tapering walls defining an elongated, transversely extending, downwardly opening discharge throat; a cylindrical feed roller rotatably carried in said hopper in coextensive closing relation to said discharge throat and having a resiliently compressible outer peripheral portion disposed normally in transversely coextensive wiping engagement with the walls of said hopper defining said discharge throat, said feed roller being operable upon axial rotation in either direction to advance material in a relatively thin, curtain-like stream from said hopper outwardly through said discharge throat; multiple speed, motion-transmitting means drivingly connected between said ground wheel and said feed roller and selectively operable upon rotation of said ground wheel in either direction to rotate said roller at variable rates of speed relative to the speed of rotation of said ground wheel; manually adjustable control means connected with said motion-transmitting means for selecting the speed of rotation of said feed roller with respect to said ground wheel; and manually operable clutch means connected with said motion-transmitting means for drivingly disconnecting said feed roller from said ground wheel.

2. A hand-propelled spreader as defined in claim 1, wherein said ground wheel and said feed roller are rotatably carried on a common axle and said motion-transmitting means comprises a circular driving member connected for rotation with said ground wheel; an intermediate circular driven member disposed in axially offset, spaced parallel relation to said driving member; a gear drivingly connected with said roller and said intermediate circular driven member; and a rotatable friction disk having a peripheral surface engageable with both said driving and driven members and movable radially with respect to both said members; and wherein said manually adjustable control means comprises lever means connected with said friction disk for moving the same radially of said driving and driven members.

References Cited by the Examiner

UNITED STATES PATENTS

| 771,060 | 9/04 | Gould et al. | |
|---|---|---|---|
| 2,237,504 | 4/41 | Roath. | |
| 2,733,838 | 2/56 | Neff | 111—1 X |
| 2,865,536 | 12/58 | Price | 222—177 |

LOUIS J. DEMBO, *Primary Examiner.*

RAPHAEL M. LUPO, *Examiner.*